(No Model.)
2 Sheets—Sheet 1.

H. T. BENSON.
ORE CONCENTRATOR.

No. 577,711. Patented Feb. 23, 1897.

Witnesses

Inventor
H. T. Benson.
By his Attorney (No Model.) 2 Sheets—Sheet 2.

H. T. BENSON.
ORE CONCENTRATOR.

No. 577,711. Patented Feb. 23, 1897.

Witnesses

Inventor
H. T. Benson.
By his Attorney

UNITED STATES PATENT OFFICE.

HARRISON T. BENSON, OF DENVER, COLORADO.

ORE-CONCENTRATOR.

SPECIFICATION forming part of Letters Patent No. 577,711, dated February 23, 1897.

Application filed March 31, 1896. Serial No. 585,668. (No model.)

*To all whom it may concern:*

Be it known that I, HARRISON T. BENSON, a citizen of the United States of America, residing at Denver, in the county of Arapahoe and State of Colorado, have invented certain new and useful Improvements in Ore-Concentrators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ore-concentrators; and it consists of the features hereinafter described and claimed, all of which will be fully understood by reference to the accompanying drawings, in which is illustrated an embodiment thereof.

Figure 1:
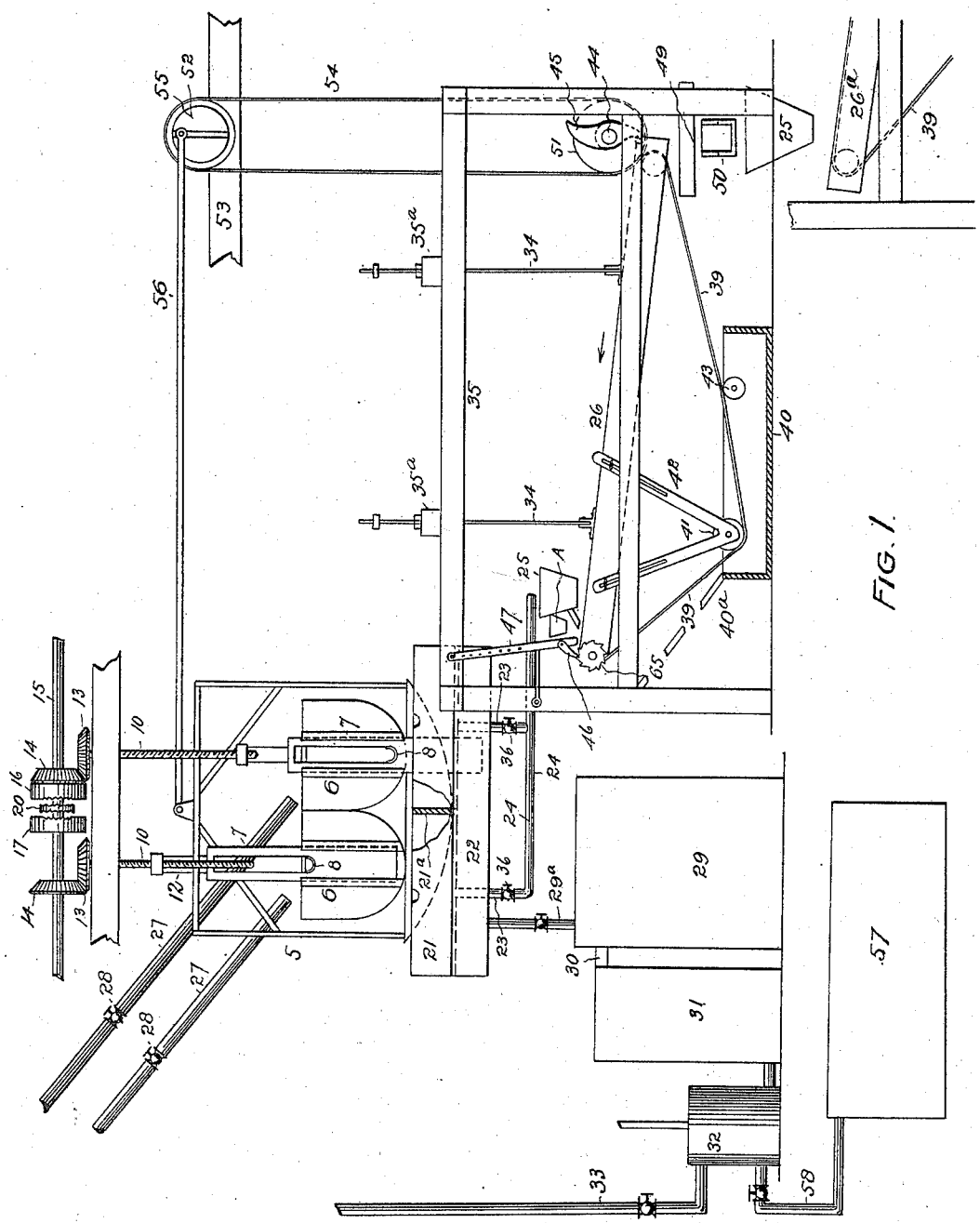
Figure 2:
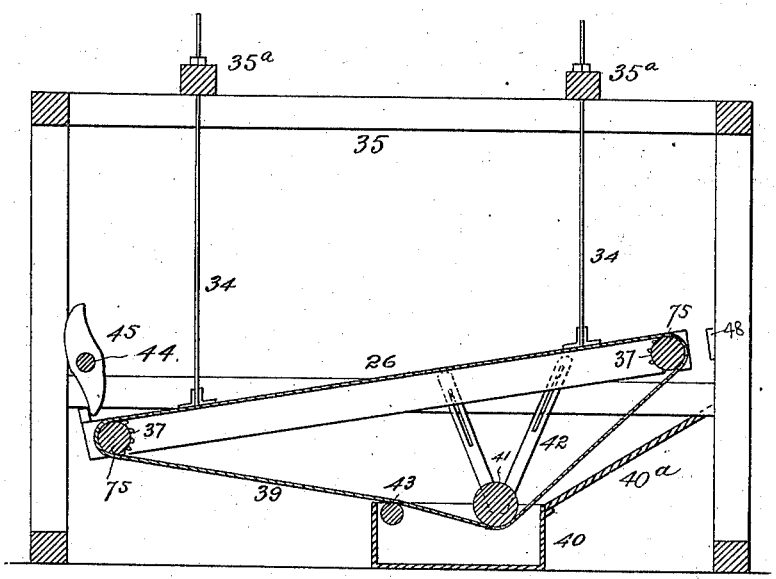
Figure 3:
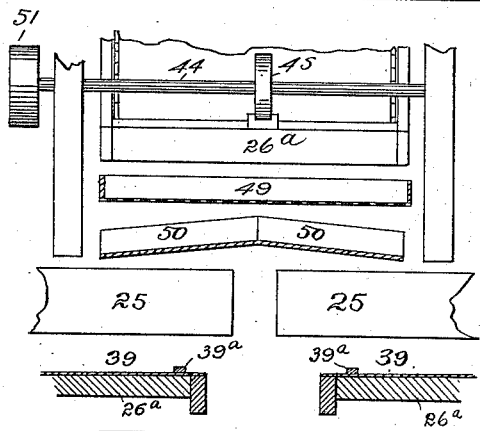
Figure 4:
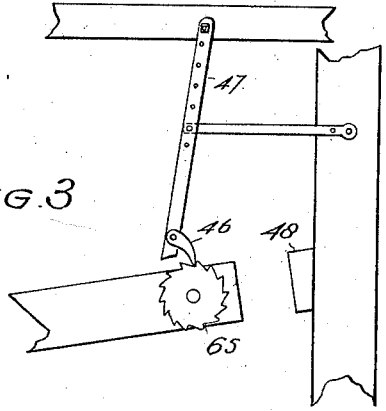
Figure 5:
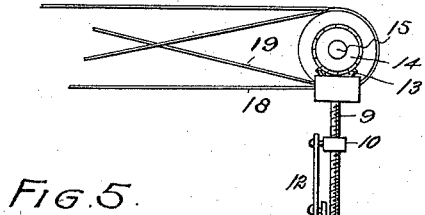
Figure 6:
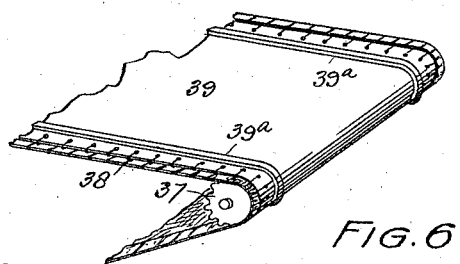

In the drawings, Figure 1 is a side elevation of the apparatus. Fig. 2 is a longitudinal section taken through the center of the concentrating-table. Fig. 3 is a rear end view of the apparatus. Figs. 4, 5, and 6 are fragmentary views illustrating details of construction.

Similar reference-characters indicating corresponding parts in these views, let the numeral 5 designate a rocking frame, upon which are rigidly mounted two tanks 6 open at the top to receive the comminuted ore from a suitable pulverizer or stamp-mill. One end of each tank 6 is provided with a vertical discharge-slot, controlled by a gate 7, whose upper portion is provided with an opening coinciding as to position with the slot in the end of the tank. From this opening in the gate leads a short chute 8, which is located far enough above the lower extremity of the gate to permit the closing of the slot in the end of the tank when the gate is raised to its upward limit of movement. Each gate is actuated or moved upward and downward by means of a worm or vertical screw-shaft 10, engaging a nut 9, which is connected with the upper extremity of the gate by a link 12, which is movably attached to the connected parts. The upper extremities of the worms 10 are provided with bevel-gears 13, meshing with other similar gears 14, fast on a horizontal shaft 15, carrying two loose pulleys 16 and 17. One of these pulleys is connected with a line-shaft (not shown) by means of a straight belt 18, while the other pulley is connected with the same shaft by means of a crossed belt 19. (See Fig. 5.) Between the pulleys 16 and 17 and splined on the shaft 15 is a clutch member 20, having two clutch-faces adapted to engage counterpart faces formed on the adjacent sides of the pulleys 16 and 17. The worms 10 are oppositely threaded, that is to say, one of them has a right and the other a left thread. The gates 7 are so arranged that when one is at its upward limit of movement the other is at its downward limit of movement.

Assuming that the line-shaft is in motion, the gates may be operated by shifting the clutch member 20 to engagement with either pulley. Motion will thus be imparted to the shaft 15, and thence to the worms 10 through the medium of the bevel-gears 13 and 14. Since the worms are provided with right and left threads, respectively, as one gate is moved upward the other will move downward or in the opposite direction, and when these gates have finished their respective upward and downward movements the position of the clutch member 20 is reversed, whereby it is made to engage the other pulley, thus imparting a reverse movement to the shaft 15, and consequently to the worms 10. Hence the upper gate will start downward and the lower gate upward.

In front of the tanks 6 and adjacent their gate ends are arranged two troughs 21 and 22. The trough 21 is nearer the tanks 6 and is more elevated than the trough 22. The trough 21 is centrally divided into two compartments by a vertical partition $21^a$, which compartments respectively receive the pulp from the two tanks. From the bottom of each of the compartments of the trough 21 leads a branch conduit 23 to a main conduit 24, which leads to a hopper 25, mounted just above the head of the concentrating-table 26, and occupying a position transverse to the table's length. The branch conduits 23 are controlled by suitable stop-cocks 36.

The pulp from the stamp-mill or pulverizer is alternately discharged into the two tanks 6 via conduits 27, controlled by suitable cut-offs or stop-cocks 28. The pulp is always passing into the tank 6 whose gate is rising. The thin portion of the pulp or the water, together with all the mineral held in suspension thereby, passes out of the tank via the chute 8, attached to the gate, as the latter rises, while the body of the ore is collected in the tank and prevented from escaping by the rising gate. The water or thin pulp falls into one compartment of the trough 21, the branch conduit being closed by its stop-cock 36 against the escape of this water via said conduit. Hence the water accumulates in the compartment of the trough 21 and overflows into the trough 22, from which it passes into a settling-tank 29 via a conduit 29ª, and thence via an overflow-pipe 30 to another tank 31, from which it may be returned to the stamp-mill or pulverizer via a pump 32 and a conduit 33.

The upward movement of the gate 7 of either tank is so regulated that while it permits the water and the mineral held in suspension thereby to run off in the manner just explained it retains the thick portion of the pulp or the body of the ore containing the mineral adapted to settle by its own gravity, and when the gate 7 of either tank has reached its upward limit of movement the said tank is filled with the thick pulp or ore body, the water having been drained off and disposed of as stated. The one gate being at its upward limit of movement and the other gate at its downward limit of movement the clutch member 20 is shifted to engage the other pulley, (16 or 17, as the case may be.) This operation reverses the movement of shaft 15 and the worms 10, the result being that the down gate begins to rise and the other one to descend. The pulp from the stamp-mill is then shut off from entering the full tank and turned into the empty tank 6, a stream of pure water being turned into the full tank, the function of the water being to wash the ore out of the full tank and cause it to flow out of the tank through the gate and into one compartment of the trough 21 via the chute 8. The valve 36 controlling the branch conduit 23, leading from the compartment into which the ore falls, is then opened and the ore discharged in the form of pulp upon the table 26. During this operation of discharging the ore upon the table from one tank 6 the other tank is filling with ore as its gate rises, the water being drained off and passing into the trough 22 and thence into the settling-tank, as explained.

The table 26, which is suitably inclined, is supported by metal straps 34, passing through cross-bars 35ª, forming a part of a suitable stationary framework 35. The upper extremities of these straps are threaded and provided with adjusting-nuts for regulating the inclination of the table. Located at each extremity of the table is a roll 75, journaled in the framework and carrying sprocket-wheels 37, which engage chains 38, attached to the edges of a canvas apron 39. (See Fig. 6.) The upper surface of the apron 39 lies flat on the table, while the lower portion thereof passes downward into a tank 40 and under a tension or guide roll 41, journaled in V-shaped hangers 42, attached to the sides of the table and slotted to receive set-bolts, whereby the position of the roll 41 may be adjusted at will. The apron 39 also passes over a roll 43, journaled in the tank 40.

Journaled in the framework at the foot of the table is a shaft 44, carrying a cam 45, adapted to engage a tappet on the table and move the latter toward the right, (referring to Fig. 1.) The journal of the roll located at the head of the table carries ratchet-wheels 65, engaged by pawls 46, mounted on suitable holders 47, attached to the stationary framework. The pawl and ratchet are so arranged that as the table is actuated by the cam and moves toward the right the pawl drives the ratchet-wheel and the roll, and consequently the apron, toward the left, or in a direction indicated by the arrow. (See Fig. 1.) As the cam 45 releases the table the recoil of the spring-straps 34 throws the table in the opposite direction and against a bumper 48, attached to the stationary frame. This bumping action of the table causes the mineral to settle upon the upper surface of the canvas apron, while the water and the gangue are carried downward and discharged upon a screen 49, by which the coarser gangue is discharged from the apparatus, while the finer gangue and the mineral not caught by the apron pass through the screen into oppositely-inclined chutes 50, (see Fig. 3,) which carry said material to the tables 26ª, which are substantially the same as table 26, already described, and therefore will not need further attention in detail. These tables re-treat the material which has left the first table, and their function is to save all the values which have escaped the prior stages of the treatment.

The tank 40 beneath the table is full of water, and the mineral values caught by the apron are discharged into this tank either by washing as the apron passes through the water or by the vibration of the table resulting from the bumping action heretofore explained.

The cam-shaft 44 is rotated by connecting a pulley 51 thereon with any suitable motor. This pulley 51 is connected with a pulley 52 on a shaft 53 by means of a belt 54, said shaft carrying an adjustable crank 55, connected with the rocking frame 5 by a pitman 56. This rocking frame, carrying the tanks 6, as heretofore explained, has very little movement, the object being to subject the contents of the tank to sufficient agitation to wash the ore thoroughly and cause all the mineral of such a character that it will remain in suspension in the water to assume this condition before it leaves the tank. This water, carrying the fine or microscopic particles of mineral, is drained off, as before explained, and finally pumped back into the pulverizing-mill. By this operation the water may be used over and over again. Every time it is used it becomes richer, since the fine float or flour mineral contained therein is increased. After this water has been used until it is considered sufficiently rich for separate treatment a cut-off valve in pipe 33 leading to the pulverizing-mill is closed and the mineral-laden water is pumped directly from the tank 31 via a pipe 58 into a precipitating-tank 57, where it is subjected to any desired treatment which may be found best adapted to save the mineral in the water.

It is assumed that a portion of the mineral carried by the water which enters the tank 29 will settle in said tank and remain therein. When treating tellurium ores, this residue in the tank 29 may be subjected to treatment by the cyanid, bromid, or chlorination processes. When treating ores other than tellurium, this residue in the settling-tank may be carried in any suitable manner to the rear tables 26ª and treated thereon. By subjecting these tables to very gentle motion the silica may be separated from the values.

This apparatus is more particularly designed for the treatment of low-grade tellurium ores which will not pay for shipping and treatment at the smelters.

The special object of the screen 49 is to size the pulp and reject the coarser silica or other gangue which, passing from the screen, is discharged from the machine. The material, which is sized by passing through said screen, is divided and half of it passes to the apron of each table 26ª. The pulp is distributed on the tables 26ª in very thin sheets, and these tables should be operated more gently than the table 26. The mineral in this sized material is easily saved, since the particles of silica or other gangue, being of the same size as the mineral particles, the latter will have the greater specific gravity and will settle on the apron, while the lighter particles of silica or other gangue will be carried downward by the water and discharged at the tail of the tables.

As before stated, this apparatus is specially adapted for the treatment of tellurium ores and will save not only the mineral which will settle upon the apron by its own gravity, but also all those microscopical particles which are held in solution or suspension by the water through the agency of telluric acid or otherwise.

The endless canvas apron 39 is provided with parallel strips of rubber 39ª, attached thereto near its edges. These rubber strips serve to prevent the pulp from overflowing and escaping at the edges of the apron.

Beneath the head of the table is an inclined board or plate 40ª, adapted to catch the mineral particles which fall from the apron in front of the tank 40. This board or plate allows the water to drain into the tank 40 and either retains the mineral or allows it to pass into said tank.

Having thus described my invention, what I claim is—

1. In a concentrating apparatus, the combination of the rocking frame, the tanks rigidly mounted thereon and having a slot in one end of each, the movable gates controlling said slots, the worms engaging suitable nuts for actuating the gates, links having their extremities respectively pivoted to the nuts and to the sliding gates, means for feeding the pulp to the tanks, and means for actuating the rocking frame, substantially as described.

2. In a concentrating apparatus, the combination of the rocking frame, the tanks rigidly mounted thereon, a vertically-movable end gate controlling a suitable opening formed in one end of each tank, worms engaging nuts for actuating the gates, said worms having right and left threads, links connecting said nuts with the gates, the link extremities being pivoted to the respective parts, a suitable shaft, gears connecting said shaft with the worms, and suitable means for reversing the movement of the shaft and worms, as and for the purpose set forth.

3. In a concentrating apparatus, the combination of the rocking frame, the tanks rigidly mounted thereon and having end openings, vertically-movable gates attached to said tanks and controlling said openings, operating-worms, links connecting the gates with the worms, the link extremities being pivoted to permit the rocking motion of the tanks, and means for actuating the worms, comprising a shaft, gears connecting the shaft with the worms, loose pulleys mounted on the shaft and having clutch-faces, said pulleys being connected with the line-shaft in such a manner that they move in opposite directions, and a clutch splined on the shaft and adapted to alternately engage the clutch-faces of the pulley whereby the movement of the shaft and worms is reversed at will, as and for the purpose set forth.

4. In a concentrating apparatus, the combination of the rocking frame, the tank 6 rigidly mounted thereon and adapted to receive the ore to be treated, end gates for controlling the discharge from the tanks, means for actuating the end gates, links connecting said means with the gates, the extremities of the links being pivoted to the connected parts, a settling-tank adapted to receive the water from the tanks 6, suitable means for causing the water to travel from the settling-tank back to the pulverizing-mill whereby it may be used as many times as desired, and a precipitating-tank into which the water is finally drawn from the settling-tank, substantially as described.

In testimony whereof I affix my signature in the presence of two witnesses.

HARRISON T. BENSON.

Witnesses:
G. J. ROLLANDET,
CHAS. E. DAWSON.